FISH EGG INCUBATORS
Filed March 11, 1960 2 Sheets-Sheet 1
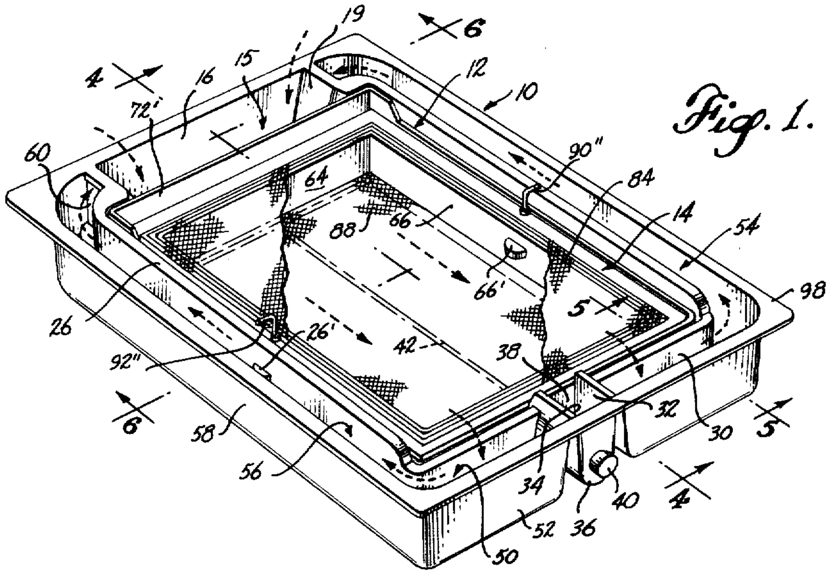
Fig. 1.
Fig. 4.
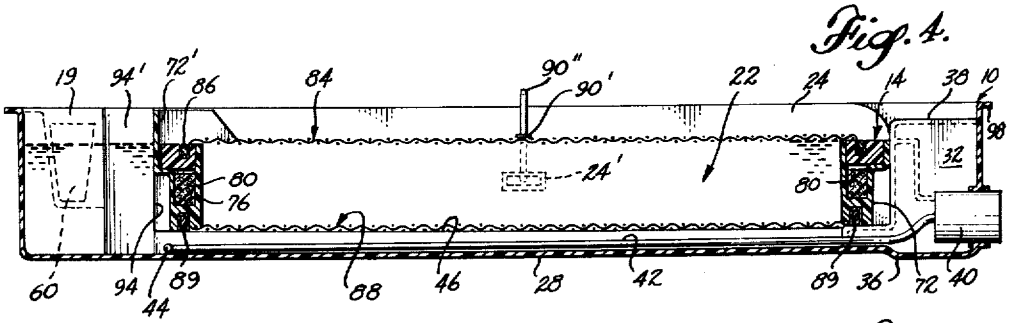
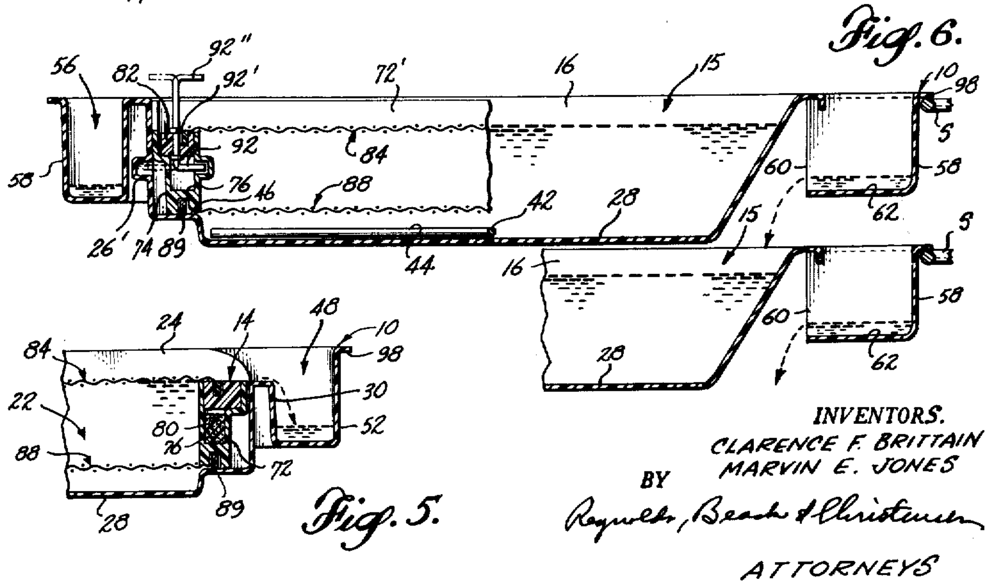
Fig. 6. Fig. 5.
INVENTORS.
CLARENCE F. BRITTAIN
MARVIN E. JONES
BY
Reynolds, Beach & Christensen
ATTORNEYS March 13, 1962 C. F. BRITTAIN ET AL 3,024,764

FISH EGG INCUBATORS

Filed March 11, 1960 2 Sheets-Sheet 2

INVENTORS.
CLARENCE F. BRITTAIN
MARVIN E. JONES

BY Reynolds, Beach & Christensen

ATTORNEYS 3,024,764
FISH EGG INCUBATORS

Clarence F. Brittain, Seattle, and Marvin E. Jones, Kent, Wash., assignors to Heath Aircraft, Inc., Kent, Wash., a corporation of Washington Filed Mar. 11, 1960, Ser. No. 14,259
11 Claims. (Cl. 119—3)

This invention relates to improvements in fish egg incubator devices of the tray type. While the invention is herein illustratively described by reference to the presently preferred form thereof, it will be recognized that certain modifications and changes therein with respect to details may be made without departing from the essential features involved.

The existing technique of incubating in holder trays stacked one above another has proved to be a convenient and successful technique which is particularly appealing because of the minimal floor space required and the versatility of arrangement which it makes possible in a hatcher building. Fresh water continuously supplied to the top tray in the stack cascades successively down through the trays in a continuous flow which keeps the batches of eggs immersed in water which is intended to circulate uniformly through them.

The present invention is broadly directed to improvements in the form and construction of existing trays used in this technique so as to overcome certain difficulties and shortcomings which have limited the benefits obtainable heretofore. One of these difficulties, of a most serious nature, was the considerable loss of eggs and fry for reasons traceable to the inability of previous trays to provide a constantly uniform circulation of water throughout all parts of the holder compartment in which the eggs were held. An important object of the present invention is to increase the holding capacity of an incubator tray without materially increasing the volumetric capacity and size thereof and to improve the circulation system of the tray in such a way that even with the increased number of eggs incubated the losses are nil.

Another object of the invention is to improve the water channelling system in such trays so as to minimize spillage, i.e., so that independently of volumetric flow rate variations, the water will cascade efficiently from one tray to another without splashing or dribbling onto the floor.

Still another object is a versatile incubator of the described type having a more conveniently constructed and arranged holder cartridge and means of securing the same in the tray, facilitating detachment of the cartridge and removal of the cartridge cover when desired.

Convenient removability of the cartridge cover without moving the cartridge and convenient removability of the entire cartridge without disturbing the secured position of the cover thereon constitute additional specific objectives.

A related object is to improve the construction and securing means for such a holder cartridge which results in a simplified and less expensive incubator construction.

Still another object is an improved incubator wherein the holder cartridge may be removed from the tray and may be placed as a floatable pen or holder in a rearing pond or the like, so that the hatched fry may be conveniently confined and protected against predatory losses.

In accordance with the invention as herein disclosed flow barrier walls are provided along substantially the full length of both sides of the tray adjoining the holder cartridge and across the end thereof adjacent the reception well or pocket into which water is poured from the next overlying tray, the arrangement being such that the received water is constrained to flow into all portions of the space beneath the holder cartridge and to well up through the perforated lower portion thereof in a uniform manner, spilling over a weir of reduced height at the opposite end of the tray in order to reach opposite side channels which carry the water back to the reception end of the tray for discharge into the next underlying tray.

In accordance with an additional feature of the invention the side channels terminate in spill openings which are directed toward each other transversely in relation to the length of the strays so as to discharge water into a central space at one end of the tray which space overlies the reception well of the next underlying tray over which the tray is superimposed. Thus changes in rate of flow, causing variations in the discharge trajectory are readily accommodated by the transversely oriented reception well which extends across a major portion of the end of the tray, and spillage or dribbling over the edges of the stacked trays is thereby avoided.

In accordance with additional features, the holder cartridge in which the eggs are retained during the incubation stage and, if desired, during subsequent fry culture stages, is provided with flotation means by which the entire holder cartridge, detached from the tray, may be placed afloat in a rearing pond or the like while protecting the fry within it from predatory attack. In addition, such holder cartridge includes a three-position latch means by which, in one position, the cover is secured in the cartridge without latching the cartridge to the tray. In a second position of the latch means the cover, and thereby the cartridge as a whole, is latched to the tray. In its third position, the cover and cartridge are separable from each other and from the tray.

These and other features, objects and advantages of the invention will become more fully evident from the following description thereof by reference to the accompanying drawings.

FIGURE 1 is an isometric view of the improved incubator with parts assembled, and with a portion of the cover broken away to show details of construction.

FIGURE 4 is a longitudinal sectional view taken on line 4—4 in FIGURE 1.

FIGURE 5 is a fragmentary longitudinal sectional view taken on line 5—5 in FIGURE 1.

FIGURE 6 is a staggered transverse sectional view taken on line 6—6 in FIGURE 1 with respect to one tray and a portion of an underlying tray in order to illustrate the stacking and water discharge arrangement of cooperating trays.

Figure 2:
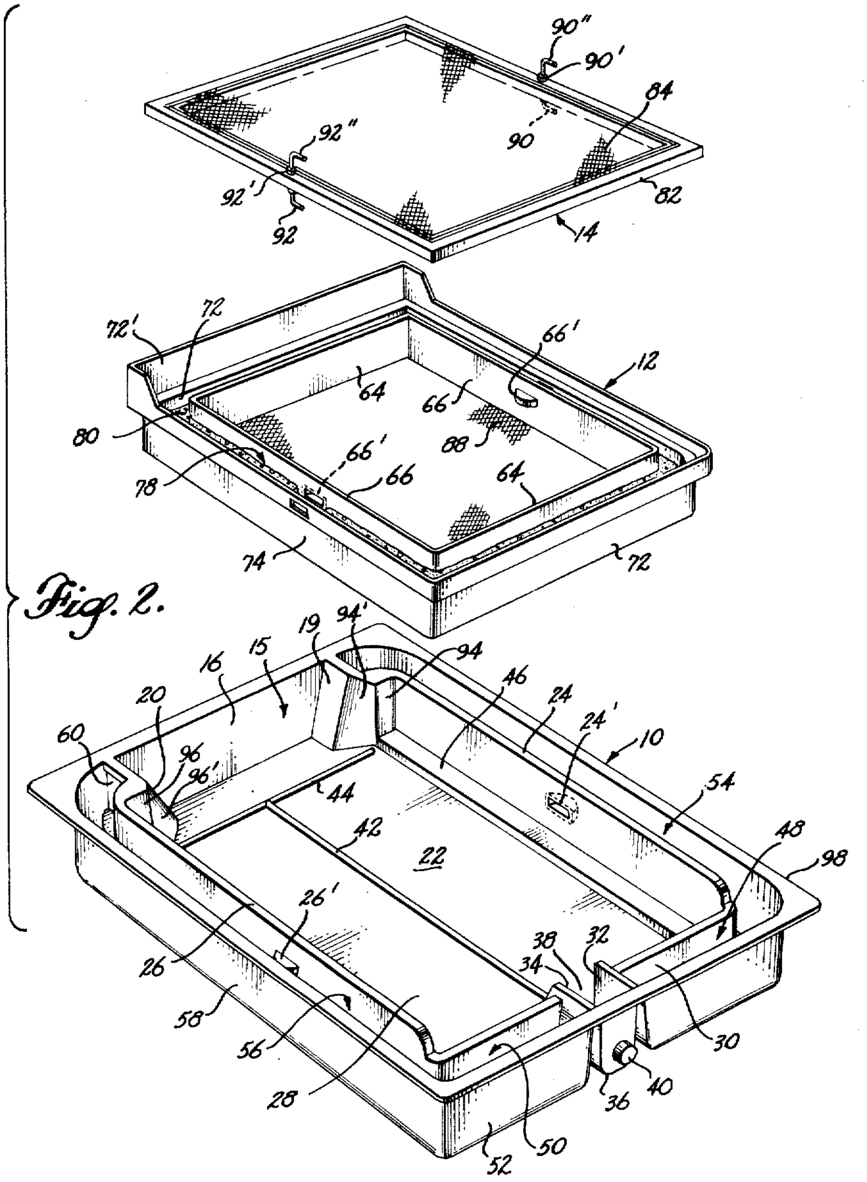
FIGURE 2 is an exploded isometric view showing the incubator with the holder cartridge removed from the tray and with the holder cartridge cover removed from the holder cartridge.

Referring to the drawings, the incubator generally comprises the tray 10 and the associated holder cartridge 12 having a removable cover 14. Preferably the tray components are largely of molded glass fiber and plastic construction.

The tray 10 is preferably of rectangular proportions somewhat longer than wide, and of a relatively shallow depth in relation to its length and width dimensions. At one end, which may be considered its rear end, the tray has a water reception pocket or well 15 which extends across the major width of the tray and for a small fraction of its length. One side of this well is formed by the tray's end wall 16 whereas the opposite ends of the well are formed by short inwardly sloping walls 19 and 20 which lie transverse to the wall 16, hence extend longitudinally of the tray. The side of the well opposite the end wall 16 opens into the general interior space or holder compartment 22, opposite sides of which are formed by the barrier walls 24 and 26 and the bottom of which is formed by the tray bottom 28. The end of the holder compartment 22 opposite the reception well 15 is formed by a weir wall 30 of a lesser height than the barrier side walls 24 and 26, and is of a substantially uniform height along its full length. This weir wall 30 is interrupted intermediate the sides of the tray and is connected to the adjacent end wall of the tray by transversely spaced dividers 32 and 34 which extend downwardly to or preferably below the level of the tray bottom and are joined by a depressed extension 36 of the tray bottom in order to form a clean-out pocket 38 which opens into the holding chamber 22 and has an apertured end wall designed to receive a drain plug 40. This drain plug carries a longitudinally extending rod 42, across the projecting end of which is secured a scraper 44. By drawing this scraper from its initial position adjacent the well 15 toward the drain plug end of the tray, accumulated sediment is drawn to the clean-out pocket, from which it is discharged through the drain plug opening. The provision of such a sediment-collecting clean-out pocket, the entrance of which is relatively wide and the floor of which is as low as or lower than that of the holding chamber, as distinguished from a mere aperture or hole in the end wall of the tray represents an improvement over previous trays.

At opposite sides of the holder compartment 22, supporting ledges 46 extend along the intersections of the tray bottom 28 and barrier side walls 24 and 26, respectively. These ledges extend the length of the compartment 22 and serve as elevating supports for opposite sides of the holder cartridge 12. A water distribution space is thus formed between the bottom of the holder cartridge 12 and the tray bottom 28. Water enters this space from the reception pocket 15 and wells up through the holder cartridge in a uniform manner over substantially the entire area of the latter.

Figure 3:
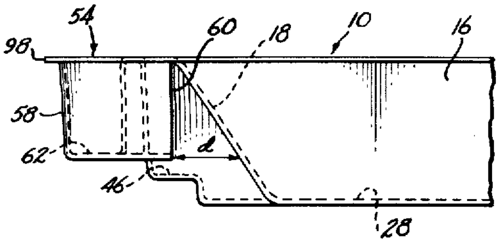
FIGURE 3 is a fragmentary end view of the tray.

Water discharging over the end weir 30 is collected in the transverse channel spaces 48 and 50 which are formed between the tray's end wall 52 and the respectively adjacent portions or sections of weir wall 30 set off by the dividers 32 and 34. Such water is then conducted back toward the rear end of the tray through side channels 54 and 56 defined between the outer side walls 58 of the tray and the outer sides of the respectively adjacent barrier walls 24 and 26. At the rear end of the tray the channels 58 turn approximately at right angles inwardly toward each other and terminate in transversely directed spill openings 60 located between the water reception chamber end walls 19 and 20 and the respectively adjacent sides of the tray. Clearance space *d* (FIGURE 3) is allowed between the lip of each spill opening and the adjacent wall 19 or 20, partly as a result of the slope of the latter, whereby return water discharging from the openings 60 is free to follow an inward trajectory which will carry it into the receiving pocket or well 14 of the next underlying tray without spillage. Moreover, because of the substantial length of the receiving pocket 15 extending transversely of the tray any variations in the trajectory due to variations in flow velocity will still be accommodated.

As will be observed, the bottom wall 62 of the end ducts 48 and 50 and the side ducts 54 and 56 are elevated somewhat above the tray bottom 28 inasmuch as the necessary flow capacity in these channels is achieved with a shallower depth than the depth of the tray as a whole. This is a detail of construction resulting in the saving of material.

The relative dimensions of the interior of the tray (i.e., the holder compartment 22) and the exterior of the holder cartridge 12 are such that the sides of the latter seat on the supporting elevated ledges 46, with the ends of the holder cartridge lodged between the weir 30 and the short transversely extending sections of end wall 94 and 96 which interconnect the respectively opposite barrier walls 24 and 26 and the reception pocket end walls 19 and 20. Between the wall portions 19 and 94 there is disposed an angled wall section 94', there being a similar wall section 96' at the opposite side of the tray.

The holder cartridge 12 comprises a box-like rectangular structure having a set of inner walls comprising the end walls 64 and the connecting side walls 66, and further having a set of outer walls comprising end walls 72 and opposite side walls 74. The inner and outer walls are interconnected in spaced-apart relationship by a bottom web 76 extending continuously therearound to form an upwardly open channel 78 in the base portion of which preferably is lodged a light-weight cellular packing 80, such as unicellular foamed plastic material, cork, or other buoyancy means to form a flotation cell, and the upper portion of which serves as a reception slot to accommodate the frame 82 of the cover 14. Stretched across the frame 82 is a cover screen 84 which is frictionally held in a slot formed in the top of the frame by means of wedging ring strip 86 extending continuously around the screen. The holder cartridge bottom is preferably also in the form of a screen 88 likewise frictionally held in a slot in the bottom of the web 76 by means of a wedging ring strip 89. Thus the holder cartridge has both perforate top and bottom permitting free ingress and egress of water over all areas of the cartridge so that eggs and fry held within the cartridge may be subjected to uniform passage of fresh water at all times.

Across the end of the holder cartridge 12 which is stationed adjacent the receiving pocket 15, the outer end wall 72 is made higher, as indicated at 72' than the opposite end walls and the side walls. Preferably the end wall 72' is made substantially as high as the barrier side walls 24 and 26 so as to insure retention of water within the holder compartment 22, hence, in the space occupied by the holder cartridge, except for the discharge which is permitted to occur across the end weir 30. In consequence, water entering the space between the tray bottom 28 and the perforate bottom of the holder cartridge 12 wells up in a more or less uniform pattern of flow throughout the entire area of the cartridge and thereby circulates past all of the contents therein. It is found that with such a circulatory system, indicated by the dotted-line arrows or flow lines, made possible by confining the discharge from the holder chamber 22 to that which overflows the weir wall 30, at the end opposite the receiving pocket 15, uniform flow through the holder cartridge interior occurs and the losses are nil even though the number of eggs placed in the tray may be considerably greater (viz. 7,000 or 8,000 as against 5,000 eggs) than was considered feasible with previous trays of similar size in which the losses were relatively heavy.

While it is convenient to provide the barrier end wall 72', on the holder cartridge itself, such a barrier wall could, of course, be provided as a part of the tray proper to the same effect.

In order to secure the holder cartridge cover 14 in a conveniently detachable manner to the holder cartridge frame and likewise to secure the holder cartridge as a whole in a conveniently detachable manner to the tray proper the barrier side walls 24 and 26 have recesses or pockets 24' and 26' therein at locations which are intermediate opposite ends and between top and bottom thereof. Similar slots or recesses 68' and 70' are respectively formed at corresponding positions in the interior side walls 68 and 70 of the holder cartridge. The cover frame 82 is provided with L-shaped latches 90 and 92 which turn on vertical axes in supports 90' and 92' carried by the sides of the cover frame. Upward extensions of the latches 90 and 92 comprise actuating shafts having turned ends serving as handles 90'' and 92'', respectively. With the latches 90 and 92 turned into parallel relationship with the cover frame sides which support them, these latches are disengaged from both sets of the retaining recesses, so that the cover is removable from the holder cartridge and the holder cartridge is removable from the tray. With the latches 90 and 92 engaging the recesses 24' and 26', respectively, the holder cartridge cover 14 and thereby the holder cartridge are latched securely to the tray. However, with the latches engaging the recesses 68' and 70' the cover is latched only to the holder cartridge and the latter is free to be removed from the tray. Thus by the three available positionings of the latches 90 and 92 the desired readily disengageable latch features are provided in a relatively simple and inexpensive manner.

It will be evident that with the cover 14 secured to the holder cartridge 12 and with the latter removed from the tray, the buoyancy of the holder cartridge permits it to be floated in a rearing pond or other body of water. The relative buoyancy imparted to the tray by reason of the flotation means therein incorporated is preferably such that the tray floats with its major portion submerged, so that the entire contents of the holder cartridge will be immersed.

Around the entire periphery of the tray at the top thereof is a reinforcing flange 98 which also serves as a convenient supporting ledge and a readily graspable lip for convenience in handling and carrying the trays. The flange at opposite sides of the tray serves as a ledge by which the trays may be supported out of contact with each other, resting slidably on external supports S (FIGURE 6). In this manner it will not be necessary to rest the trays in direct contact with each other and individual trays may be removed without disturbing the adjacent trays. The lattitude which is afforded by the relatively wide expanse of the reception pockets 15 and the manner in which the transverse discharge of water occurs through the spill openings 60, allowing for variations in trajectory, permits one or more trays to be removed from intervening tray spaces in a stack without the resulting change in the point of intersection of the water fall from an upper tray and the receiving pocket 15 of the next underlying tray causing spillage as a result thereof.

These and other aspects of the invention will be evident to those skilled in the art based on the foregoing disclosure of the preferred embodiment of the invention.

We claim as our invention:

1. A fish egg incubator comprising a tray structure having support elements supporting in mutually superposed relationship similar tray structures having a water reception chamber at one end thereof, a holding chamber adjoining said water reception chamber and extending therefrom toward the opposite end of the tray, said holding chamber having barrier side walls and having a substantially imperforate weir wall extending transversely between the barrier side walls at the end of said holding chamber opposite said reception chamber, egg holder means including perforate top and bottom walls, extending generally horizontally in vertically spaced relationship between said barrier side walls, with said bottom wall maintained above the bottom of the holding chamber to form a water distribution space into which water flows from the water reception chamber beneath said egg holder means to well upwardly into and through the latter for outflow through the perforate top thereof, a barrier end wall extending transversely between the barrier side walls at the end of the holding chamber opposite the weir wall, said weir wall having a lesser height than said end wall and said barrier side walls, whereby discharge flow of water from the holding chamber is confined primarily to overflow at the weir wall, and duct means extending between the ends of the tray structure, including a duct portion at one end arranged to receive the weir wall overflow and a spill opening at the opposite end adapted to discharge such overflow water in a trajectory which is intercepted by the water reception chamber of a similar tray structure placed in corresponding position directly underlying the defined tray structure.

2. The incubator defined in claim 1, wherein the egg holder means comprises a separately removable holder cartridge which includes enclosing side wall structure extending therearound, a perforate bottom wall and a detachable perforate covering top wall, said side wall structure including flotation means imparting a degree of total buoyancy to the cartridge by which the same will float on water with its major portion submerged.

3. The incubator defined in claim 2, wherein the cartridge cover includes three-position latch means movable through a range including two separate latching positions and an unlatched position, a first cooperating latch element on the cartridge wall structure engageable by the latch means in a first latching position thereof to hold the cover latched to such wall structure, and a second cooperating latch element on a tray structure wall engageable by the latch means in a second latching position thereof to hold the cover and thereby the cartridge latched to the tray structure, said latch means in its unlatched position being disengaged from both latch elements, permitting removal of cartridge and cover from the tray structure.

4. The incubator defined in claim 3, wherein the duct means comprise a duct extending along the weir wall and a barrier side wall to a terminus comprising a transversely directed spill opening through which water discharges in a trajectory which extends inwardly across the adajcent end of the tray and in the region directly beneath the water reception chamber in order to pour into the water reception chamber of the next underlying tray structure.

5. The incubator defined in claim 1, wherein the duct means comprise a duct extending along the weir wall and a barrier side wall to a terminus comprising a transversely directed spill opening through which water discharges in a trajectory which extends inwardly across the adjacent end of the tray and in the region directly beneath the water reception chamber in order to pour into the water reception chamber of the next underlying tray structure.

6. A fish egg incubator comprising a tray having means forming flow channels extending across one end thence along opposite sides thereof to respective termini at the opposite end, means forming spill openings at the respective channel termini directed transversely across said opposite end of the tray whereby water discharges in an inward direction from the tray sides in a trajectory lying beneath such first end thereof, said tray further having means forming an upwardly open water reception pocket located in the space between said spill openings, a holding chamber situated in the space embraced by said flow channels and having a bottom space in communication with said reception pocket, means forming walls surrounding said holding chamber on all sides, including a weir wall, of lower height than the other walls, at the end of the tray opposite said pocket, whereby water overflows said weir wall from the holding space and discharges into the flow channels at the first end of the tray, and means forming an egg holder compartment comprising perforate vertically spaced panels extending horizontally in the holding chamber between the surrounding walls thereof, with the lowermost perforate panel located above the holding chamber bottom and the uppermost perforate panel located below the top of said walls except said weir wall.

7. The incubator defined in claim 6, and transversely spaced pocket-forming upright walls interposed in the flow channel at the first-mentioned end of the tray, and means interconnecting said pocket-forming walls and defining therewith a clean-out pocket opening endwise into the holding chamber, a drain opening in said interconnecting end wall, a plug removably secured in said drain opening, and scraper means secured to said plug and operable to draw sediment across the bottom of the tray holding chamber and into said pocket for discharge through said drain opening with the plug removed.

8. A fish egg incubator comprising a tray having means forming flow channels extending across one end thence along opposite sides thereof thence transversely inwardly toward each other at the opposite end of the tray, said channels terminating in open ends adjacent the respective tray sides to form spill openings directed transversely across said opposite end of the tray whereby water discharges in an inward direction from the tray sides in a trajectory lying beneath such first end thereof, said tray further having means forming an upwardly open water reception pocket located in the space between said spill openings, said pocket including transversely spaced end walls which incline upwardly and outwardly from each other, a holding chamber situated in the space embraced by said flow channels and having a bottom space in communication with said reception pocket, means forming barrier side walls extending along opposite sides of said holding chamber, a transversely extending weir wall of lower height than the side walls at the end of the holding chamber opposite said pocket, and removable means forming an egg holder compartment comprising a transverse barrier wall extending between said barrier side walls adjacent said pocket and of a height exceeding that of said weir well, whereby water overflows said weir wall from the holding space and discharges into the flow channels at the first end of the tray, said egg holder compartment further including perforate vertically spaced panels extending horizontally in the holding chamber between the surrounding walls thereof, with the lowermost perforate panel located above the holding chamber bottom and the uppermost perforate panel located below the top of said walls except said weir wall.

9. A fish egg incubator comprising a tray structure having support elements supporting in mutually superposed relationship similar tray structures having a water reception chamber at one end thereof, a holding chamber adjoining said water reception chamber and extending therefrom toward the opposite end of the tray, said holding chamber having barrier side walls with ledges formed along the inside faces thereof elevated slightly above the tray bottom, and having a substantially imperforate weir wall extending transversely between the barrier side walls at the end of said holding chamber opposite said reception chamber, egg holder means including perforate top and bottom walls, extending generally horizontally in vertically spaced relationship between said barrier side walls, said holder being adapted to rest on said ledges whereby said bottom wall is maintained above the bottom of the holding chamber to form a water distribution space into which water flows from the water reception chamber beneath said egg holder means to well upwardly into and through the latter for outflow through the perforate top thereof, a barrier end wall extending transversely between the barrier side walls at the end of the holding chamber opposite the weir wall, said weir wall having a lesser height than said end wall and said barrier side walls, whereby discharge flow of water from the holding chamber is confined primarily to overflow at the weir wall, and duct means extending between the ends of the tray structure, including a duct portion at one end arranged to receive the weir wall overflow and a spill opening at the opposite end adapted to discharge such overflow water.

10. In a fish egg incubator of the type comprising a water circulation tray and an egg holder cartridge removably mountable in the path of circulation in such tray, the tray construction comprising interconnected outer surrounding side and end walls, a bottom wall interconnecting the side walls, barrier walls spaced inwardly from the respective side walls in parallel relation thereto forming side flow channels therebetween, said barrier walls terminating short of the tray ends, a weir wall extending transversely between the barrier walls at a location spaced inwardly from one end wall to form a collection duct between such end wall and weir wall, connected to said side flow channels at that end of the tray, wall portions interconnecting the opposite end wall of the tray with the adjacent ends of the respective barrier walls to form a water reception pocket adjoining the space between the barrier walls, and means in said flow channels forming spill openings at the respective sides of the tray and at the end of the tray adjacent the water reception pocket, said spill openings being directed inwardly generally toward each other and beneath the reception pocket.

11. The tray defined in claim 10, and transversely spaced divider walls interposed across the collection duct and interconnecting the weir wall and the adjacent tray end wall, said weir wall having a gap therein between said divider walls and forming in conjunction therewith a clean-out pocket communicating with the space between barrier walls, said clean-out pocket having a drain opening therein, and a plug normally closing said drain opening.

References Cited in the file of this patent

UNITED STATES PATENTS

| | | |
|---|---|---|
| 173,262 | Brackett | Feb. 8, 1876 |
| 680,838 | Bourgeois | Aug. 20, 1901 |
| 1,007,383 | Parry | Oct. 31, 1911 |